(No Model.)

W. WAINRIGHT.
BAKE PAN.

No. 429,551. Patented June 3, 1890.

Witnesses:
E. P. Ellis,
J. M. Nesbit.

Inventor:
Wm. Wainright,
per J. A. Lehmann,
atty

UNITED STATES PATENT OFFICE.

WILLIAM WAINRIGHT, OF WINCHESTER, ILLINOIS.

BAKE-PAN.

SPECIFICATION forming part of Letters Patent No. 429,551, dated June 3, 1890.

Application filed March 21, 1890. Serial No. 344,822. (No model.)

*To all whom it may concern:*

Be it known that I, WILLIAM WAINRIGHT, of Winchester, in the county of Scott and State of Illinois, have invented certain new and useful Improvements in Bake-Pans; and I do hereby declare the following to be a full, clear, and exact description of the invention, such as will enable others skilled in the art to which it pertains to make and use it, reference being had to the accompanying drawings, which form part of this specification.

My invention relates to an improvement in bake-pans; and it consists in the particular arrangement and construction hereinafter described, and pointed out in the claim.

The object of my invention is to provide a bake-pan with means whereby the upper portion can be held in a raised position without any help on the part of the person examining the contents of the pan.

Figure 1:
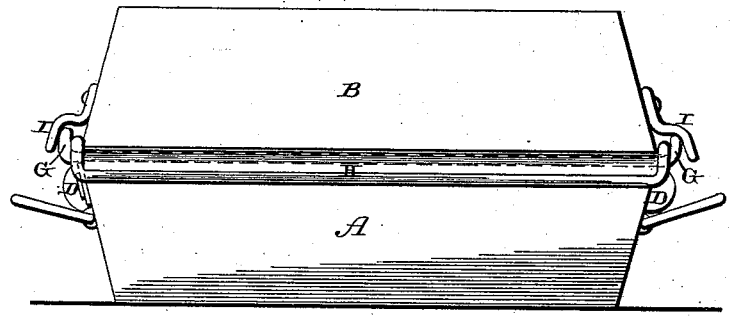
Figure 2:
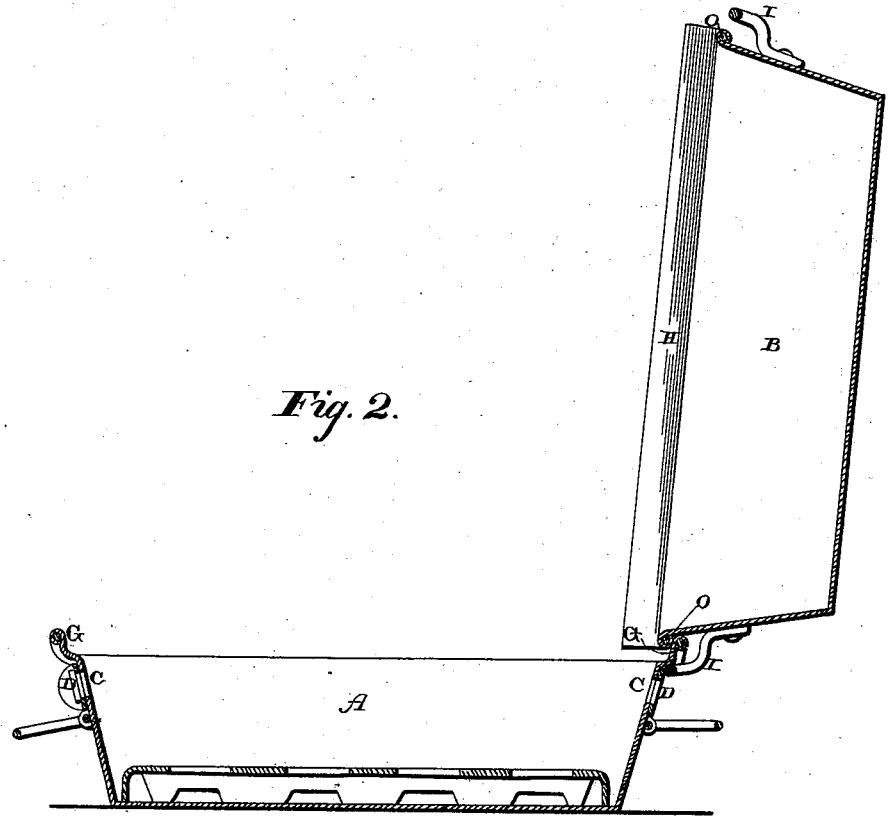

Figure 1 is a side elevation of a pan which embodies my invention. Fig. 2 is a longitudinal vertical section of the same, showing the upper portion in a raised position.

A represents the lower portion of the pan, and B the upper one, and which are given any desired shape and made to fit together in the usual manner. The lower portion A is provided with hinged handles and with air-openings C, which are controlled by the usual perforated slides D. The opposite ends of this lower portion A are turned upward, so as to form the flanges G, which extend any desired distance above the lower edge of the upper portion B of the pan. These flanges may either be given the slightly-curved shape here shown or may be made perfectly square, as may be preferred. These flanges G serve both to assist in making a tight joint with the lower edge of the upper portion B of the pan and as a means of holding the upper portion in a raised position. The opposite lower side edges of the upper portion B are also turned downward and outward, so as to form the flanges H, but no flanges are formed upon the ends of the upper portion next to the flanges G and no flanges are formed upon the side edges of the lower portion of the pan next to the flanges H. The wire which extends around the edge of upper portion B of the pan for the purpose of strengthening it forms a bead O along the ends of this portion of the pan, and this bead is intended to catch against the upper edge of the flange G when the upper portion of the pan is raised into a vertical position.

Rigidly secured to opposite ends of the upper portion B of the pan are the handles I, which are so bent or shaped as to be turned outward over the top edges of the flanges G when the upper portion of the pan is in its normal position; but when the upper portion B of the pan is turned upward, as shown in Fig. 2, the lower end of the handle I, upon the lower end thereof, rests against the end of the lower portion A of the pan below the flanges G at the same time that the bead O catches against the inner side of the upper edge of this flange. The handle bearing against the end of the lower portion of the pan, and the bead O, bearing against the inside upper edge of the flange G, serve to form a secure support for the upper portion of the pan while in a vertical position. No care upon the part of the operator is necessary in raising the upper portion of the pan, because the bead and the handle automatically engage with their corresponding parts and hold this upper portion so securely in position that there is no danger of the upper portion of the pan dropping.

Inside of the lower portion of the pan may be placed any suitable perforated shelf to keep the article being cooked from resting directly on the bottom of the pan, and thus avoid being burnt.

Having thus described my invention, I claim—

A bake-pan composed of upper and lower portions, the lower portion thereof provided with outwardly-extending flanges and the upper portion thereof provided with beads adapted to catch against the flanges, and with rigid handles which are secured thereto above the flanges and extend outward over the flanges, whereby they rest upon the lower portion of the pan when the upper portion is raised, for the purpose substantially as shown and described.

In testimony whereof I affix my signature in presence of two witnesses.

WILLIAM WAINRIGHT.

Witnesses:
JARIUS W. WEST,
JOHN H. DYER.